United States Patent
Thoren et al.

(10) Patent No.: US 8,445,864 B2
(45) Date of Patent: May 21, 2013

(54) METHOD AND APPARATUS FOR ANTI-BIOFOULING OF A PROTECTED SURFACE IN LIQUID ENVIRONMENTS

(75) Inventors: Matthew D. Thoren, Tyngsboro, MA (US); Andrew M. Piper, Nashua, NH (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/218,621

(22) Filed: Aug. 26, 2011

(65) Prior Publication Data

US 2013/0048877 A1   Feb. 28, 2013

(51) Int. Cl.
 *C02F 1/32* (2006.01)
(52) U.S. Cl.
 USPC ............ 250/455.11; 250/432 R; 250/461.1; 210/748.1; 210/748.11; 210/748.13; 210/764; 422/1; 422/6; 422/24; 422/186.3; 435/800
(58) Field of Classification Search
 USPC ............ 250/432 R, 436–438, 455.1, 458.1, 250/459.1, 461.1, 461.2, 492.1, 504 R, 522.1; 210/748.1, 748.11, 748.13, 764; 422/1, 6, 422/24, 28, 186.3; 435/800
 See application file for complete search history.

(56) References Cited

U.S. PATENT DOCUMENTS

| | | | |
|---|---|---|---|
| 2,189,279 A | 2/1940 | Bitner | |
| 3,924,139 A | 12/1975 | Hirose et al. | |
| 3,971,388 A | 7/1976 | Cowdery | |
| 4,204,956 A * | 5/1980 | Flatow | 210/87 |
| 4,234,907 A * | 11/1980 | Daniel | 362/556 |
| 4,255,383 A * | 3/1981 | Schenck | 422/24 |
| 4,296,066 A * | 10/1981 | Schenck | 422/24 |
| 4,317,041 A * | 2/1982 | Schenck | 250/435 |
| 4,320,085 A | 3/1982 | Takeguchi et al. | |
| 4,372,860 A | 2/1983 | Kaas | |
| 4,471,225 A | 9/1984 | Hillman | |
| 4,525,278 A | 6/1985 | Frost, III | |
| 4,548,716 A | 10/1985 | Boeve | |
| 4,689,523 A | 8/1987 | Fowler | |
| 4,752,401 A | 6/1988 | Bodenstein | |
| 4,762,613 A | 8/1988 | Snowball | |
| 4,778,653 A | 10/1988 | Kamimura et al. | |
| 4,948,980 A | 8/1990 | Wedekamp | |
| 5,308,505 A * | 5/1994 | Titus et al. | 210/745 |

(Continued)

FOREIGN PATENT DOCUMENTS

| | | |
|---|---|---|
| WO | WO 2005/077556 A1 | 8/2005 |
| WO | WO 2008/125339 A3 | 10/2006 |
| WO | WO 2008/125339 A2 | 10/2008 |
| WO | WO 2008/144922 A1 | 12/2008 |

OTHER PUBLICATIONS

PCT Search Report and Written Opinion of the ISA; dated May 3, 2012; for PCT Pat. App. No. PCT/US2011/046712; 18 pages.

(Continued)

*Primary Examiner* — Bernard E Souw
(74) *Attorney, Agent, or Firm* — Daly, Crowley, Mofford & Durkee, LLP

(57) ABSTRACT

A system includes a UV light source and an optical medium coupled to receive UV light from the UV light source. The optical medium is configured to emit UV light proximate to a surface to be protected from biofouling. A method corresponds to the system.

29 Claims, 8 Drawing Sheets

U.S. PATENT DOCUMENTS

| | | | | |
|---|---|---|---|---|
| 5,322,569 | A * | 6/1994 | Titus et al. | 134/1 |
| 5,354,603 | A * | 10/1994 | Errede et al. | 442/361 |
| 5,673,341 | A | 9/1997 | Takesue et al. | |
| 5,929,453 | A * | 7/1999 | Andrews et al. | 250/461.1 |
| 5,935,431 | A * | 8/1999 | Korin | 210/205 |
| 6,108,454 | A | 8/2000 | Nevis et al. | |
| 6,759,664 | B2 * | 7/2004 | Thompson et al. | 250/492.1 |
| 6,831,876 | B1 | 12/2004 | Cartwright | |
| 7,175,807 | B1 * | 2/2007 | Jones | 422/24 |
| 7,387,454 | B2 | 6/2008 | Kikuchi et al. | |
| 7,598,501 | B2 * | 10/2009 | Jones | 250/455.11 |
| 7,903,919 | B2 | 3/2011 | Mukasa | |
| 7,953,326 | B2 | 5/2011 | Farr et al. | |
| 2003/0024863 | A1 * | 2/2003 | Gannon et al. | 210/134 |
| 2003/0151739 | A1 | 8/2003 | Capaldo et al. | |
| 2005/0007448 | A1 | 1/2005 | Kaltenbacher et al. | |
| 2007/0102359 | A1 * | 5/2007 | Lombardi et al. | 210/639 |
| 2007/0170347 | A1 | 7/2007 | Fournier et al. | |
| 2008/0068926 | A1 | 3/2008 | Chambers et al. | |
| 2008/0211643 | A1 | 9/2008 | Mohr et al. | |
| 2008/0246485 | A1 | 10/2008 | Hibbs et al. | |
| 2009/0000188 | A1 | 1/2009 | Sayers et al. | |
| 2009/0192921 | A1 | 7/2009 | Hicks | |
| 2009/0194708 | A1 | 8/2009 | Studer et al. | |
| 2010/0044321 | A1 * | 2/2010 | Vestergaard Frandsen | 210/754 |
| 2010/0176056 | A1 * | 7/2010 | Rozenberg | 210/636 |
| 2011/0056276 | A1 * | 3/2011 | Scott et al. | 73/64.56 |
| 2012/0050520 | A1 * | 3/2012 | Thoren et al. | 348/81 |

OTHER PUBLICATIONS

Emirhan; "Fiber Optics in Textile;" 3$^{rd}$ International Symposium of Interactive Media Design; Istanbul, Turkey; Jan. 5-7, 2005; 6 sheets.

Thoren et al.; "Method and Apparatus for Anti-Biofouling of Optics in Liquid Enforonments;" U.S. Appl. No. 12/862,084, filed Aug. 24, 2010; 42 pages.

Partial PCT Search Report received with Invitation to Pay Additional Fees in PCT/US2011/046712 dated Dec. 23, 2011.

PCT Search Report and Written Opinion of the ISA; dated Nov. 7, 2012; for PCT Pat. App. No. PCT/US2012/047906; 12 pages.

Office Action dated Jan. 15, 2013; for U.S. Appl. No. 12/862,084; 27 pages.

PCT International Preliminary Report on Patentability and Written Opinion of the ISA; dated Mar. 7, 2013; for PCT Pat. App. No. PCT/US2011/046712; 13 pages.

* cited by examiner

METHOD AND APPARATUS FOR ANTI-BIOFOULING OF A PROTECTED SURFACE IN LIQUID ENVIRONMENTS

FIELD OF THE INVENTION

This invention relates generally to anti-biofouling apparatus and, more particularly, to an apparatus for keeping free of biological fouling a surface, for example, a ship hull, immersed in a liquid, for example, the ocean.

BACKGROUND OF THE INVENTION

Underwater objects, particularly underwater objects that are in the water for long periods of time, have external surfaces that are subject to so-called "biofouling." A used herein, the term "biofouling" is used to describe an attachment of organisms that live in the liquid, e.g., in the ocean, to surfaces, particularly to man-made surfaces. The organisms can be small, for example, algae, or larger, for example, barnacles.

Detrimental effects of biofouling to man-made surfaces are well known and wide-ranging. As is known, boats, ships, and other vessels that experience biofouling are subject to increased drag when operating in the water.

As is known, some types of coatings, for example, anti-biofouling paints, can be applied to some surfaces, for example, ship hulls, to prevent or retard biofouling. However, anti-biofouling coatings tend to degrade with time and need to be reapplied, for example, every few years. In order to reapply an anti-biofouling coating, a ship must be put to dry dock for the operation, resulting in high cost and ship down time.

Copper corrosion mechanisms or Tributyltin (TBT) biocide leaching are known. Electro-chlorination systems and automatic acid (e.g. tin dioxide) dispensing systems are also known. These mechanisms require release of chemicals into the water, proximate to the underwater surface, e.g., the ship hull. These mechanisms prevent biofouling on surfaces through localized production of bleach, via an oxidation of chloride ions present in seawater. Although the effects of such chemical systems are temporary, only lasting a few months, the effect on the environment is larger than desired for an anti-biofouling system. Furthermore the chemical release mechanisms are subjected to the ocean environment, e.g., pressure, resulting in reduced reliability.

Ultraviolet (UV) radiation consists of electromagnetic radiation between visible violet light and x-rays, and ranges in wavelength from about 400 nm to about 10 nm. UV is a component (less than 5%) of the sun's radiation and is also produced artificially by arc lamps, e.g., by a mercury arc lamp (or mercury vapor lamp).

Ultraviolet radiation in sunlight is often considered to be divided into three bands. Ultraviolet light in a UVA band (about 320-400 nm) can cause skin damage and may cause melanomatous (skin cancer). Ultraviolet light in a UVB band (about 280-320 nm) is stronger radiation that increases in the summer and is a common cause of sunburn and most common skin cancer. Ultraviolet light in a UVC band (below about 280 nm) is the strongest, having the greatest energy per photon (eV), and is potentially the most harmful form. Photon energy is calculated using: $E=h\nu=hc/\lambda$, where h is Plancks Constant, c is the speed of light, and $\lambda$ is wavelength. Therefore, the lower the wavelength of electromagnetic radiation, the greater the energy per photon.

Much of the UVB radiation and most of the UVC radiation is absorbed by the ozone layer of the atmosphere before it can reach the earth's surface. Much of the UVB and UVC radiation that does pass through the ozone layer tends to be partially absorbed by ordinary window glass or by impurities in the air (e.g., water, dust, and smoke).

Ultraviolet germicidal irradiation (UVGI) is a sterilization method that uses specific UVC wavelengths (about 260 nm, e.g., 253.7 nm) to break down and kill microorganisms. Wavelengths of UVC radiation at or near 260 nm are known to be effective in destroying nucleic acids in the microorganisms so that their DNA is disrupted. Disruption of the DNA eliminates reproductive capabilities and kills the microorganisms.

U.S. Pat. No. 5,322,569, issued Jun. 21, 1994, describes an ultraviolet generating mechanism that can prevent biofouling underwater by way of a moving ultraviolet light source. U.S. patent application Ser. No. 12/862,084, filed Aug. 24, 2010 and entitled "Method And Apparatus For Anti-Biofouling Of Optics In Liquid Environments," describes static UV light sources projected through an optics window.

It would be desirable to provide means to prevent biofouling of surface, e.g., an opaque surface, disposed in the water without using chemicals. It would be desirable to have such a system that can prevent biofouling to a degree that would reduce or eliminate the need to remove the surface, e.g., a surface upon a vessel, from the water.

SUMMARY OF THE INVENTION

The present invention provides means to prevent biofouling of surface, e.g., an opaque surface, disposed in the water without using chemicals, wherein the system can prevent biofouling to a degree that would reduce or eliminate the need to remove the surface, e.g., a surface upon a vessel, from the water.

In accordance with one aspect of the present invention, a system for anti-biofouling a protected surface includes an ultraviolet light source configured to generate ultraviolet light. The system also includes an optical medium disposed proximate to the protected surface and coupled to receive the ultraviolet light. The optical medium has a thickness direction perpendicular to the protected surface. Two orthogonal directions of the optical medium orthogonal to the thickness direction are parallel to the protected surface. The optical medium is configured to provide a propagation path of the ultraviolet light such that the ultraviolet light travels within the optical medium in at least one of the two orthogonal directions orthogonal to the thickness direction, and such that, at points along a surface of the optical medium, respective portions of the ultraviolet light escape the optical medium.

In accordance with another aspect of the present invention, a method of anti-biofouling a protected surface includes generating ultraviolet light. The method also includes distributing the ultraviolet light about a protected surface though an optical medium disposed proximate to the protected surface. The optical medium has a thickness direction perpendicular to the protected surface, wherein two orthogonal directions of the optical medium orthogonal to the thickness direction are parallel to the protected surface. The optical medium is configured to provide a propagation path of the ultraviolet light such that the ultraviolet light travels within the optical medium in at least one of the two orthogonal directions orthogonal to the thickness direction, and such that, at points along a surface of the optical medium, respective portions of the ultraviolet light escape the optical medium.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the present invention, some introductory concepts and terminology are explained. As used herein, the term "protected surface" refers to a surface that would become fouled with organisms were it not protected by one of the embodiments of the system described below.

As used herein, the term "optical medium" is used to describe an ultraviolet carrying and/or ultraviolet emitting part of the systems described below. As will become apparent, the optical medium is used to distribute the ultraviolet light to protect the protected surface from fouling with organisms. As will also become apparent, there are many embodiments of the optical medium.

In some embodiments, the optical medium is coupled to receive ultraviolet light from one or more ultraviolet light sources. In some other embodiments, the optical medium is conjoined with one or more ultraviolet light sources.

As used herein, the term "ultraviolet light source" is used to describe any emitter of ultraviolet light, including both narrowband ultraviolet light emitters and also broadband ultraviolet light emitters. It will be understood that a broadband ultraviolet light emitter may emit not only ultraviolet light, but also light at other parts of the electromagnetic spectrum, including visible light. Light from the broadband ultraviolet light emitter may or may not be passed through a narrowband optical filter.

It should be noted that reference is sometimes made herein to assemblies or surfaces having a particular shape (e.g., flat or cylindrical). One of ordinary skill in the art will appreciate, however, that the techniques described herein are applicable to a variety of sizes and shapes.

Figure 1:
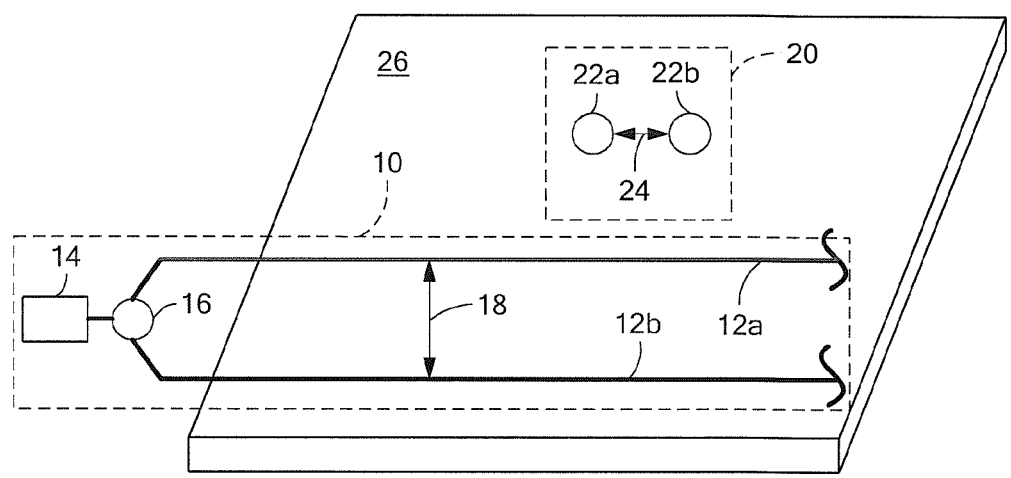
FIG. 1 is a pictorial showing a protected surface with two optical fibers and two light emitting diodes (LEDS) disposed thereon.

Referring to FIG. 1, an exemplary system 10 includes an optical medium comprised of two (or more) optical fibers 12a, 12b coupled through a coupler 16 to receive ultraviolet (UV) light from an ultraviolet light source 14. The UV light source 14 can be any type of UV light source, however, a laser UV light source is preferred. The laser UV light source can be any type of laser UV generator.

UVC radiation for ultraviolet germicidal irradiation (UVGI) is conventionally generated using mercury vapor lamps. In some embodiments the UV light source 14 comprises one or more mercury vapor lamps. In other embodiments, the UV light source 14 comprises one or more UV lasers, for example, excimer lasers. In other embodiments, the UV light source 14 comprises one or more UV light emitting diodes (LEDS).

It will be understood that in other applications, for example, communications applications, escape of the UV light from the optical fibers 12a, 12b would be very undesirable. However, in the system 10, the optical fibers 12a, 12b have special characteristics described more fully below that allow a determined amount of the UV light to escape from the optical fibers along lengths of the optical fibers.

It will be understood that a largest amount of UV power is carried within respective ends of the optical fibers 12a, 12b closest to the UV light sources 14. Therefore, in some embodiments, the characteristics of the optical fibers that allow UV light to escape are selected to change along lengths of the optical fibers 14a, 14b. The changing characteristics can be selected to result in a substantially equal amount of UV light escaping at each point down the lengths of the optical fibers 14a, 14b, even though the UV power within the optical fibers 12a, 12b may drop down the lengths of the optical fibers 12a, 12b.

The two optical fibers 12a, 12b have a selected spacing 18, selected to result in a sufficient intensity of UV light between the two optical fibers to retard or eliminate growth of biofouling organisms upon a protected surface 26 in the region between the two optical fibers 12a, 12b, and also in regions adjacent to the optical fibers 12a, 12b.

The amount of power can correspond to an average intensity of about twenty $\mu W/cm^2$ at any given area along the protected surface. This intensity can result from a combination of multiple light emitting sources. The amount of power emitted per unit length of fiber is directly proportional to the fiber spacing 18. The closer the spacing 18, the less power required per fiber per unit length. For example, a UV source providing three Watts of light will cover, if the light is perfectly coupled to the protected surface, an area of approximately fifteen square meters.

An amount of power generated by the UV light source 14 is selected based upon lengths of the optical fibers 12a, 12b, upon the spacing 18, and upon a desired lowest amount of UV intensity between the two optical fibers 12a, 12b. For example, for the two optical fibers 12a, 12b with lengths of fifty meters, a spacing 18 of one centimeter, and a lowest intensity of UV light equal to about twenty µW per square centimeter between the two optical fibers 12a, 12b, a total power (per fiber) of the UV light source 14 can be about one hundred milliwatts, or a total intensity of about two milliwatts per meter-centimeter delivered to each one of the two optical fibers 12a, 12b. This power can be in the range of about fifty to about one hundred fifty milliWatts. This example results in two fibers protecting about one square meter of a protected surface.

In some embodiments, the optical fibers 12a, 12b transmit UVC light having an intensity resulting in about twenty μW per square centimeter at all points between optical fibers 12a, 12b and also for regions surrounding each of the optical fibers 12a, 12b. However, the intensity can be more than or less than twenty μW per square centimeter, for example, within a range of about ten to about thirty μW per square centimeter to prevent biofouling.

While some factors are described above, the intensity of the UVC light can be also selected in accordance with a variety of other factors, for example, a temperature of the water, a type of the water (e.g., fresh or salt water), or a type of organism (e.g., barnacles) for which anti-biofouling is desired.

Another system 20 can include a UV light source comprised of two (or more) UV light emitting diodes (LEDS) 22a, 22b. The UV LEDS have a spacing 24. Light emitted by the two UV LEDS can have a beamwidth and a power, which, together with the spacing 24 are selected to result in a sufficient intensity of UV light between the two UV LEDS and surrounding the two UV LEDS 22a, 22b to retard or eliminate growth of biofouling organisms upon the protected surface 20.

An amount of power generated by each one of the two UV LEDS 22a, 22b is selected based upon the spacing 24, upon the beamwidth, and upon a desired lowest amount of UV intensity between the two UV LEDS 22a, 22b. For example, for a beamwidth of about one hundred twenty degrees, a spacing 24 of one centimeter, and a lowest intensity of UV light equal to about twenty μW per square centimeter between the two UV LEDS, a total power of each one of the two UV LEDS 22a, 22b can be about 200 μW delivered by each one of the two UV LEDS 22a, 22b. This power can be in the range of about 100 μW to about 300 μW.

The UV LEDs 22a, 22b are known to have optical beam widths ranging from about zero to about one hundred twenty degrees. In one embodiment, beamwidths of the two UV LEDS 22a, 22b are about one hundred twenty degrees.

In some embodiments, the UV LEDS 22a, 22b transmit UVC light having an intensity resulting in about twenty μW per square centimeter at all points between the UV 22a, 22b and also for regions surrounding each of the two UV LEDS 22a, 22b. However, the intensity can be more than or less than twenty μW per square centimeter, for example, within a range of about ten to about thirty μW per square centimeter.

As described above for the system 10, while some factors are described above, the intensity of the UVC light can be selected in accordance with a variety of other factors, for example, a temperature of the water, a type of the water (e.g., fresh or salt water), or a type of organism (e.g., barnacles) for which anti-biofouling is desired (e.g., barnacles).

The two optical media (the optical fibers and the UV LEDS) can be used separately or in conjunction with each other. In some embodiments, the UV light source 14 and the UV LEDS 22a, 22b transmit UVC light having a wavelength of about 254 nm.

While two optical fibers 12a, 12b are shown, there can be more than two or fewer than two optical fibers. While two UV LEDS 22a, 22b are shown, there can be more than two or fewer than two UV LEDS. In general, a larger protected surface 20 will require more optical fibers and/or more UV LEDS, or more UV power, in order to retard or eliminate growth of biofouling organisms upon the protected surface 20.

Light emitting diodes (LEDs) that can transmit ultraviolet light in the UVA, UVB, and UVC parts of the ultraviolet spectrum are recently available. In particular, UV LEDs (e.g., AlInGaN LEDs) are recently available with appropriate sizes and that can transmit UVC with sufficient intensities and efficiencies to provide the UV light source 14 or the UV LEDS 22a, 22b.

Figure 1A:
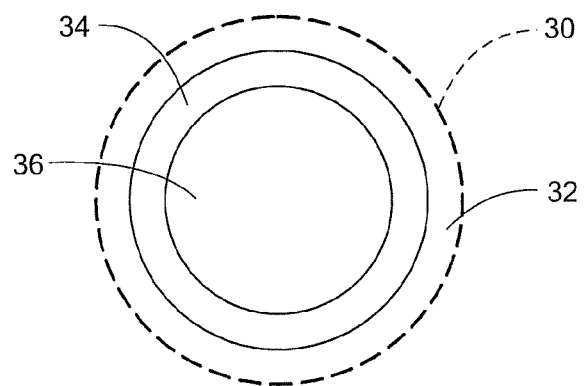
FIG. 1A is a cross section showing a cross-sectional view of an optical fiber.

Referring now to FIG. 1A, an exemplary optical fiber 30 includes at least a core 36 configured to carry ultraviolet light. In some embodiments, the optical fiber 30 also includes a cladding 34 surrounding the core 36. For communication optical fibers, the cladding 34 is configured (i.e., has a suitable index of refraction) to keep the ultraviolet light from escaping the core 36. However, as described more fully below, optical fibers used herein are configured to allow some ultraviolet light carried within the core 36 to escape the optical fiber 30.

The core 36 and the cladding can be comprised of a variety of materials, including, but not limited to, a Silica core with a Silica cladding and a Fluorinated Ethylene Propylene (FEP) core with an Ethylene Tetrafluoroethylene (ETFE) cladding.

In some embodiments, the index of refraction of the core 36 is within the range of about 1.4 to about 1.5 and the index of refraction of the cladding is in a corresponding range of about 1.3 to about 1.4.

In some embodiments, the cladding 34 is not used. In these embodiments, the core 36 can be comprised of a variety of materials, including, but not limited to polymethylpentene (PMP), or polyether ether ketone (PEEK). For example, a TPX® material from Mitsui can be used. With these embodiments, the index or refraction of the core 36 can be about 1.46, but within a range of about 1.4 to about 1.5.

In some conventional communication optical fibers, the optical fiber 30 also includes a jacket 32. The jacket 32 is omitted for exemplary embodiments described herein.

As is known, the core diameter is selected based upon a variety of factors, including, but not limited to a wavelength of the light that travels in the core 36, and a mode of the light that travels in the core 36. It is known that a multi-mode core tends to have a larger diameter than a single mode core.

A variety of core diameters of the core 36 can be used. In some embodiments, the core 36 is a multi-mode core and has a diameter of about three hundred to about six hundred microns.

Figure 2:
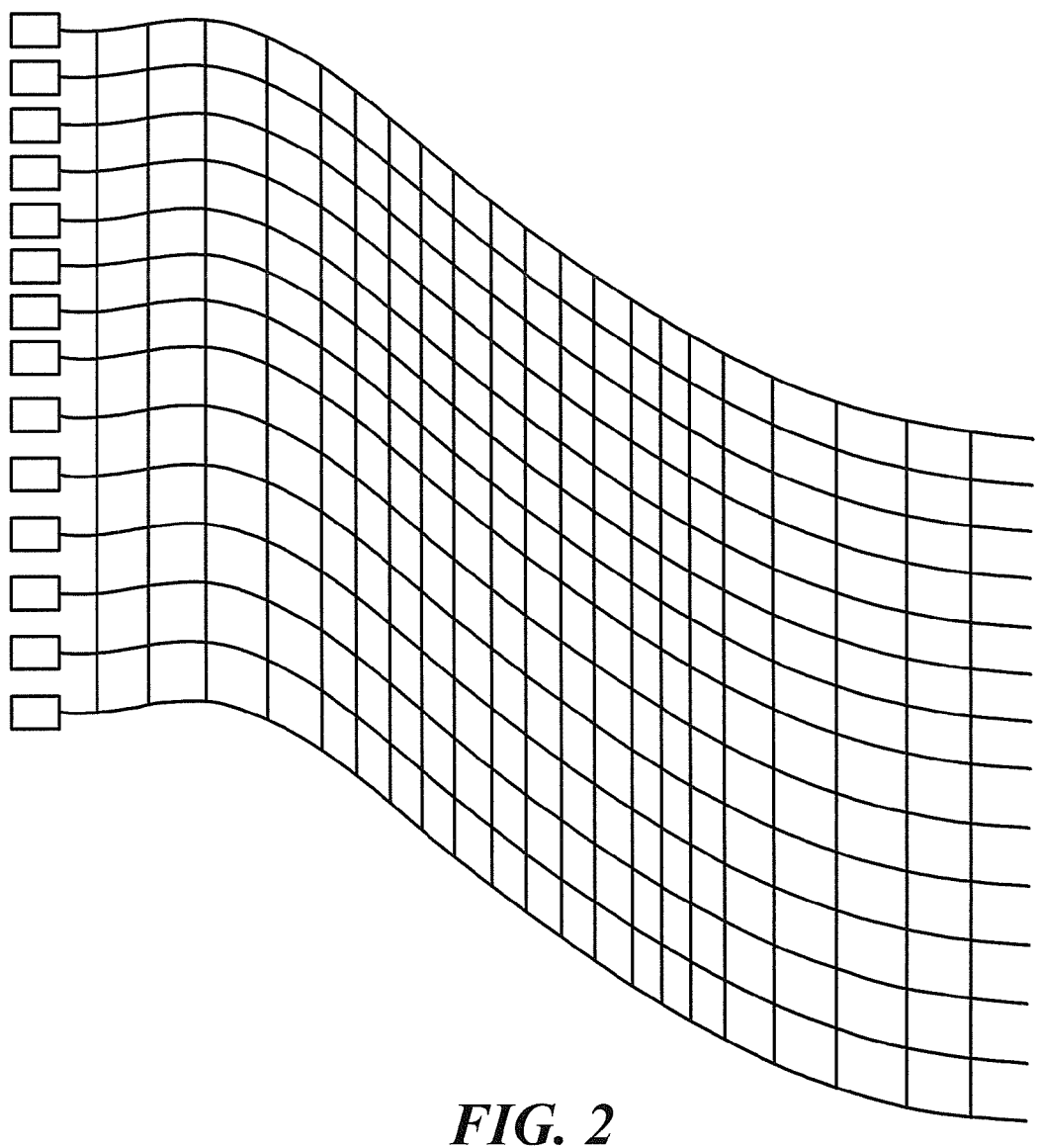
FIG. 2 is a pictorial showing optical fibers woven into a fiberglass mesh, with ultraviolet light sources coupled to ends of some of the optical fibers.

Referring now to FIG. 2, an optical medium can include a plurality of optical fibers woven into a mesh, which can be a woven mesh. The mesh can include other fibers that are not optical fibers. Optical fibers are shown as horizontal fibers of the mesh, each optical fiber coupled to receive UV light from a UV light source, shown as a respective box, coupled to transmit UV light into one respective end.

While all of the horizontal fibers of the mesh are each shown to be a respective optical fiber with a respective UV light source, in other embodiments, only some of the horizontal fibers of the mesh are optical fibers.

While none of the vertical fibers of the mesh are shown to be optical fibers, in some other embodiments, all or some of the vertical fibers are optical fibers coupled to other UV light sources (not shown).

While a separate UV light source is shown coupled to each one of the optical fibers, in other embodiments, some or all of the optical fibers can receive UV light from one UV light source through an optical coupler or the like.

While the vertical and horizontal fibers of the mesh are shown to be orthogonally disposed, in other arrangements, the fibers are disposed at other angles, for example, thirty degrees or sixty degrees.

In general, fiberglass meshes, but without optical fibers, are known. In some embodiments, the portions of the mesh that are not optical fibers are comprised of, but are not limited to, glass, Kevlar, Carbon fiber, Vectran, and Aramid. In some embodiments, portions described above to be fibers that are not optical fibers can instead be structural members, for example, metal or composite members.

In other embodiments, the mesh can be comprised of, but is not limited to, an FEP mesh, a PEEK mesh, an ETFE mesh, a PMP mesh, or a THV mesh having the plurality of optical fibers disposed (e.g., woven) therein.

Discussion above in conjunction with FIG. 1 regarding spacings of the optical fibers 12a, 12b, UV power of light applied to the optical fibers 12a, 12b, and characteristics of the optical fibers 12a, 12b that change down lengths of the optical fibers also apply to the optical fibers within the mesh.

The mesh of FIG. 2 can be applied to a surface, for example, to the protected surface 26 of FIG. 1, with a bonding agent, causing the mesh to adhere to the protected surface 26 and to add structural strength and stability to the mesh.

The bonding agent applied to the mesh of FIG. 2 should preferably have UV light stability, i.e., should not change properties with respect to transmission of the UV light. The bonding agent can be comprised of, but is not limited to, a modified acrylic (for example, Loctite 352).

In some embodiments, the mesh of FIG. 2 extends down an entire length of a subsurface part of a ship's hull however, in other embodiments, a plurality of meshes each with their own UV light source(s) can be used to cover the length of the ship's hull.

Figure 3:
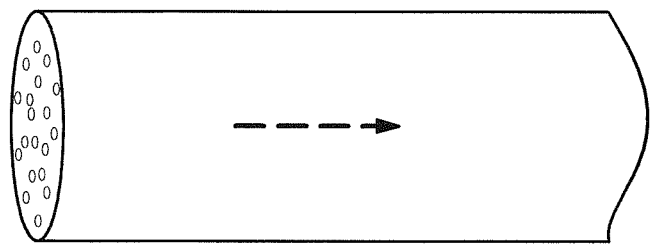
FIG. 3 is a block diagram of an optical fiber having objects, for example, scattering particles, including, but not limited to, air bubbles or nanoparticles, disposed therein.
Figure 3A:
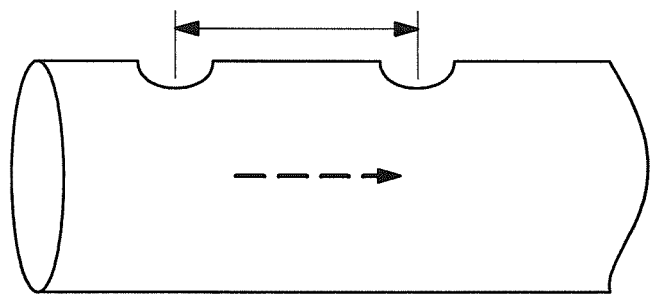
FIG. 3A is a block diagram of another optical fiber having microbends disposed thereon.
Figure 3B:
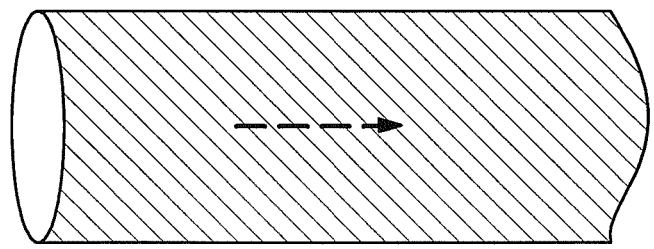
FIG. 3B is a block diagram of another optical fiber having a surface roughness disposed thereon.
Figure 3C:
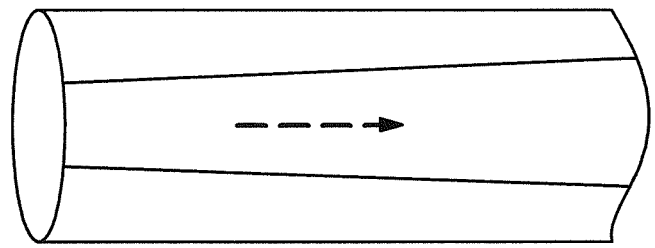
FIG. 3C is a block diagram of another optical fiber having a non-round cross sectional shape, e.g., a D-shape.

FIGS. 3-3C show optical fibers, but only cores of optical fibers. The optical fibers below can also include respective cladding layers (not shown). Arrows in each one of FIGS. 3-3C are indicative of a primary direction of UV light carried by the optical fibers. However, as described below, UV light also escapes the optical fibers in other directions. Techniques described below could be applied to the cladding (not shown) alone, or in conjunction with techniques described below as applied to the core.

Referring now to FIG. 3, an optical fiber can be used as the optical fibers of FIGS. 1 and 2. The optical fiber is filled with light scattering objects. For example, a holey fiber is known and is filled with tiny gas bubbles or voids. The holey fiber passes some light down the holey fiber in a direction of an arrow, yet some light escapes the holey fiber in other directions.

In other embodiments, the light scattering objects can be nanoparticles. The nanoparticles can be comprised of, but are not limited to, silicon nanoparticles. Presence of the nanoparticles, like presence of the holes in the holey fiber, results in some UV light, and preferably a controlled amount of the UV light, escaping the optical fiber.

The optical fiber can be impregnated with many types of light scattering objects, which can include, but which are not limited to, air pockets, plastic particles, metal particles, or glass particles.

As described above in conjunction with FIG. 1, in order to cause approximately the same amount of light to escape the optical fiber down a length of the optical fiber, it may be desirable to provide the optical fiber with a physical characteristic that changes down the length of the optical fiber. In some embodiments, the physical characteristic that changes comprises a number of the light scattering objects per volume within the optical fiber or within selected ones of a plurality of optical fibers. Thus, at a first region along the optical fiber, the optical fiber has a first number of light scattering objects per volume embedded therein, and at a second region along the optical fiber, the optical fiber has a second different number of light scattered objects per volume embedded therein. In some embodiments, the number of light scattering objects per volume can increase down the length of the fiber in a direction away from the ultraviolet light source.

Referring now to FIG. 3A, an optical fiber can be used as the optical fibers of FIGS. 1 and 2. The optical fiber has so-called "microbends" upon the surface of the optical fiber. The optical fiber of FIG. 3A passes some light down the optical fiber in a direction of an arrow, yet some light escapes the optical fiber in other directions.

In some embodiments, the microbends can result when the optical fiber is part of the mesh as shown in FIG. 2 and the mesh is compressed. The compression results in fibers running across the optical fiber of FIG. 3A placing dents or microbends in the optical fiber.

As described above in conjunction with FIG. 1, in order to cause approximately the same amount of light to escape the optical fiber down a length of the optical fiber, it may be desirable to provide the optical fiber with a physical characteristic that changes down the length of the optical fiber. In some embodiments, the physical characteristic that changes comprises a number of the microbends per unit length upon the optical fiber or upon selected ones of a plurality of optical fibers. Thus, at a first region along the optical fiber, the optical fiber has a first number of microbends per length disposed thereon, and at a second region along the optical fiber, the optical fiber has a second different number of microbends per length disposed thereon thereon. In some embodiments, the number of microbends per length can increase down the length of the fiber in a direction away from the ultraviolet light source.

Referring now to FIG. 3B, an optical fiber can be used as the optical fibers of FIGS. 1 and 2. The optical fiber has a surface roughness indicated by a crosshatch upon the surface of the optical fiber. The surface roughness can be generated, for example, by abrasion techniques, or, for another example, by chemical etching techniques. The abrasion or etching is applied to the core of the optical fiber. Similar techniques can be applied to the cladding (not shown).

As described above in conjunction with FIG. 1, in order to cause approximately the same amount of light to escape the optical fiber down a length of the optical fiber, it may be desirable to provide the optical fiber with a physical characteristic that changes down the length of the optical fiber. In some embodiments, the physical characteristic that changes comprises roughness of the surface roughness along a length of the optical fiber or along lengths of selected ones of a plurality of optical fibers. Thus, at a first region along the optical fiber, the optical fiber has a first surface roughness disposed thereon, and at a second region along the optical fiber, the optical fiber has a second different surface roughness disposed thereon. In some embodiments, the surface roughness can increase down the length of the fiber in a direction away from the ultraviolet light source.

Referring now to FIG. 3C, an optical fiber can be used as the optical fibers of FIGS. 1 and 2. The optical fiber has a flattened surface upon one or more surfaces of the optical fiber. The flattened surface can be generated, for example, by abrasion techniques, or, for another example, by chemical etching techniques, or for another example, by extrusion techniques as the optical fiber is formed. The resulting optical fiber can have a cross section with a D shape. However, other shapes are also possible.

As described above in conjunction with FIG. 1, in order to cause approximately the same amount of light to escape the optical fiber down a length of the optical fiber, it may be desirable to provide the optical fiber with a physical characteristic that changes down the length of the optical fiber. In some embodiments, the physical characteristic that changes comprises a cross-sectional shape of the optical fiber along a length of the optical fiber or along lengths of selected ones of a plurality of optical fibers. The cross section is taken parallel to a thickness direction of the optical fiber. Thus, at a first point (cross section) along the optical fiber, the optical fiber has a first cross-sectional shape, and at a second point (cross section) along the optical fiber, the optical fiber has a second different cross-sectional shape. In some embodiments, the flat part of the cross-sectional shape can become greater down the length of the optical fiber in a direction away from the ultraviolet light source.

While it is described above in conjunction with FIGS. 3-3B that other characteristics of the optical fiber can change down the length of the optical fiber, in some embodiments, the number of light scattering particles, the number of microbends, or the surface roughness remains substantially constant down the length of the optical fibers, and the cross-sectional shape changes down the length of the optical fibers to control and to keep consistent and amount of light emitted by the optical fibers. However in still other embodiments the number of light scattering particles, the number of microbends, or the surface roughness of the optical fiber can change down the length of the optical fiber and the cross-sectional shape of the optical fiber can change down the length of the optical fiber as well.

Figure 4:
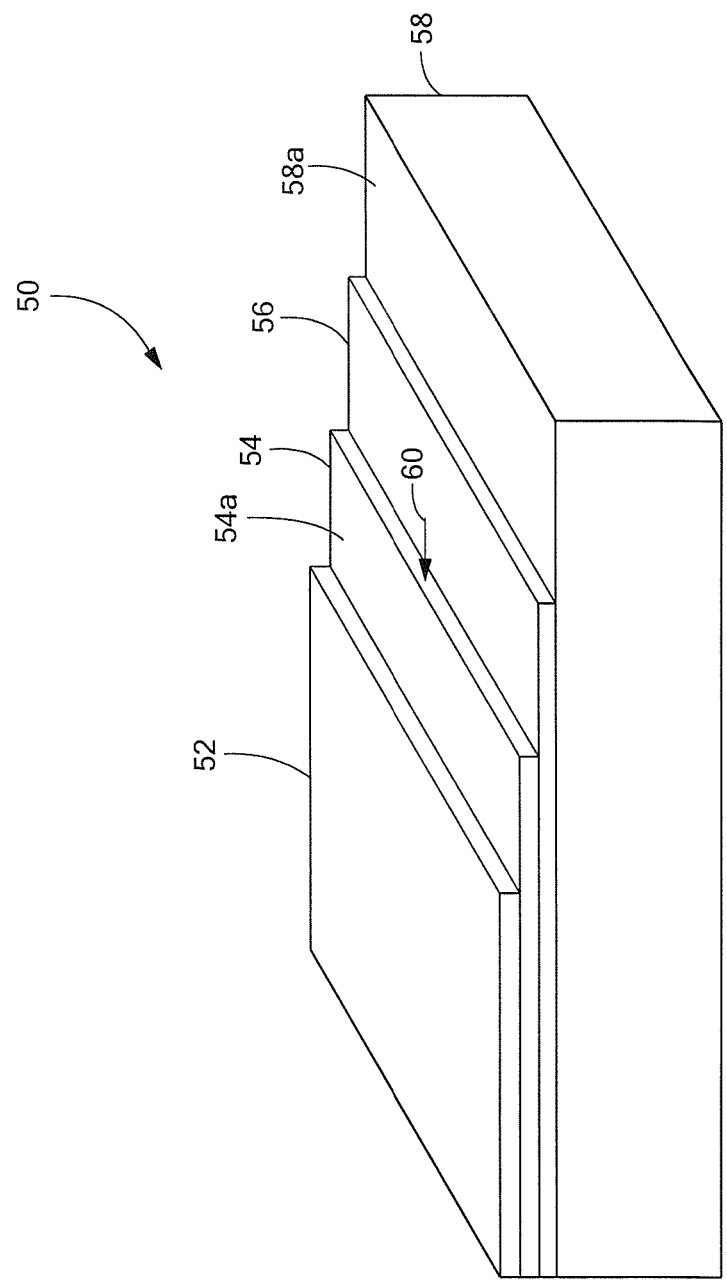
FIG. 4 is a block diagram showing an optical coating disposed upon a protected surface.

Referring now to FIG. 4, an optical medium 50 includes an optical coating (or layer) 54 bonded proximate to a protected surface 58a of a structure, for example, a ship's hull 58. The optical coating 54 is configured to provide the propagation path of ultraviolet light 60 in one or more directions parallel to a surface 54a of the optical coating 54, within the optical coating 54.

The optical medium 50 can also include a reflective coating (or layer) 56 under the optical coating 54 and a coating (or layer) 52 over the optical coating 54, which is transparent or substantially transparent to UV light. UV light, represented by an arrow 60, can propagate in the optical coating 54 in any direction.

In some embodiments, the optical layer 54 is comprised of, but is not limited to, a urethane acrylate, for example, Permacol 387/10 (refractive index of 1.48) or Dymax OP-4-20632 (refractive index of 1.554).

In other embodiments, the optical layer 54 is comprised of, but is not limited to, an amorphous Polytetrafluoroethylene (PTFE or Teflon™), a Hexafluoropropylene and Vinylidene fluoride (THV), a Polyether ether ketone (PEEK), a Fluorinated ethylene propylene (FEP), an Ethylene Tetrafluoroethylene (ETFE), or a Polymethylpentene (PMP).

In some embodiments, the reflective layer 56 is comprised of, but is not limited to, a polished metal film and/or an aluminized/metalized polyester film, e.g., Mylar.

A characteristic of the optical coating 54 can be selected to allow, at any region along the surface 54a surface of the optical coating 54, a determined percentage of a total power of an ultraviolet light source (not shown) to escape the optical layer. In order to achieve this behavior, the optical coating 54 can have a characteristic that changes about the surface 54a of the optical coating 54. For example, the surface 54a of the optical coating 54 can have s surface roughness that changes about the surface 54a. In other embodiments, the optical coating can be impregnated with light scattering particles, the density of which changes about the optical coating 54.

The above listed changing characteristics can change in a pattern about the surface. For example, the changing characteristics can change radially and continuously from a point at which UV light enters the optical coating 54. In other embodiments, the changing characteristics can change radially and discontinuously (e.g., in rings) from a point at which UV light enters the optical coating 54. In other embodiments, the changing characteristics can change along parallel lines and continuously from a point or from a line at which UV light enters the optical coating 54. In other embodiments, the changing characteristics can change along parallel lines and discontinuously from a point or from a line at which UV light enters the optical coating 54.

In some embodiments, bonds between the various layers 52, 54, 56 and between the layer 56 and the surface 58a comprise chemical bonds.

In some embodiments, bonds between the various layers 52, 54, 56 and between the layer 56 and the surface 58a comprise adhesive bonds.

In some embodiments, the reflective coating 56 is not used. In these embodiments, the surface 58a can be polished. In some embodiments, the coating 52 is not used.

Figure 5:
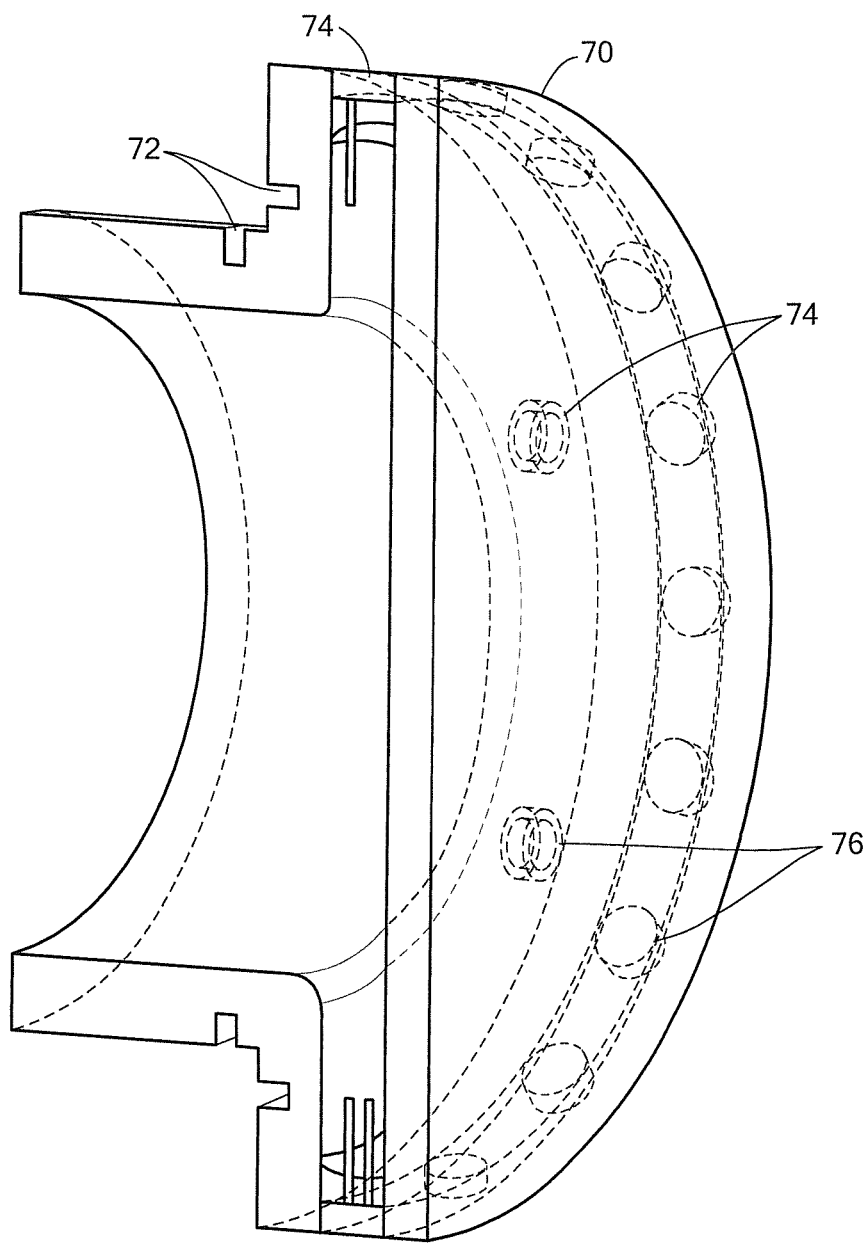
FIG. 5 is a block diagram showing an exemplary penetrating structure configured to penetrate through a protected surface, for example, the protected surfaces of FIG. 1 or 4, wherein the penetrating structure includes an optical structure configured to generate ultraviolet light and configured to inject the ultraviolet light into an optical medium.

Referring now to FIG. 5, an exemplary penetrating structure 70 is configured to penetrate through a protected surface, for example, the protected surface 58a of FIG. 4 or the protected surface 26 of FIG. 1. The penetrating structure 70 comprises a seal region 72 coupled between the penetrating structure and the protected surface. In some embodiments the seal region 72 includes a seal, for example, an O-ring seal (not shown). An optical structure 74 is configured to generate the ultraviolet light and configured to inject the ultraviolet light into an optical medium, for example, into the optical fibers 12a, 12b, of FIG. 1, the optical fibers of FIG. 2, the optical fibers of FIGS. 3-3C, or the optical layer 54 of FIG. 4.

The optical structure 74 can include a plurality of UV LEDS 76.

Figure 6:
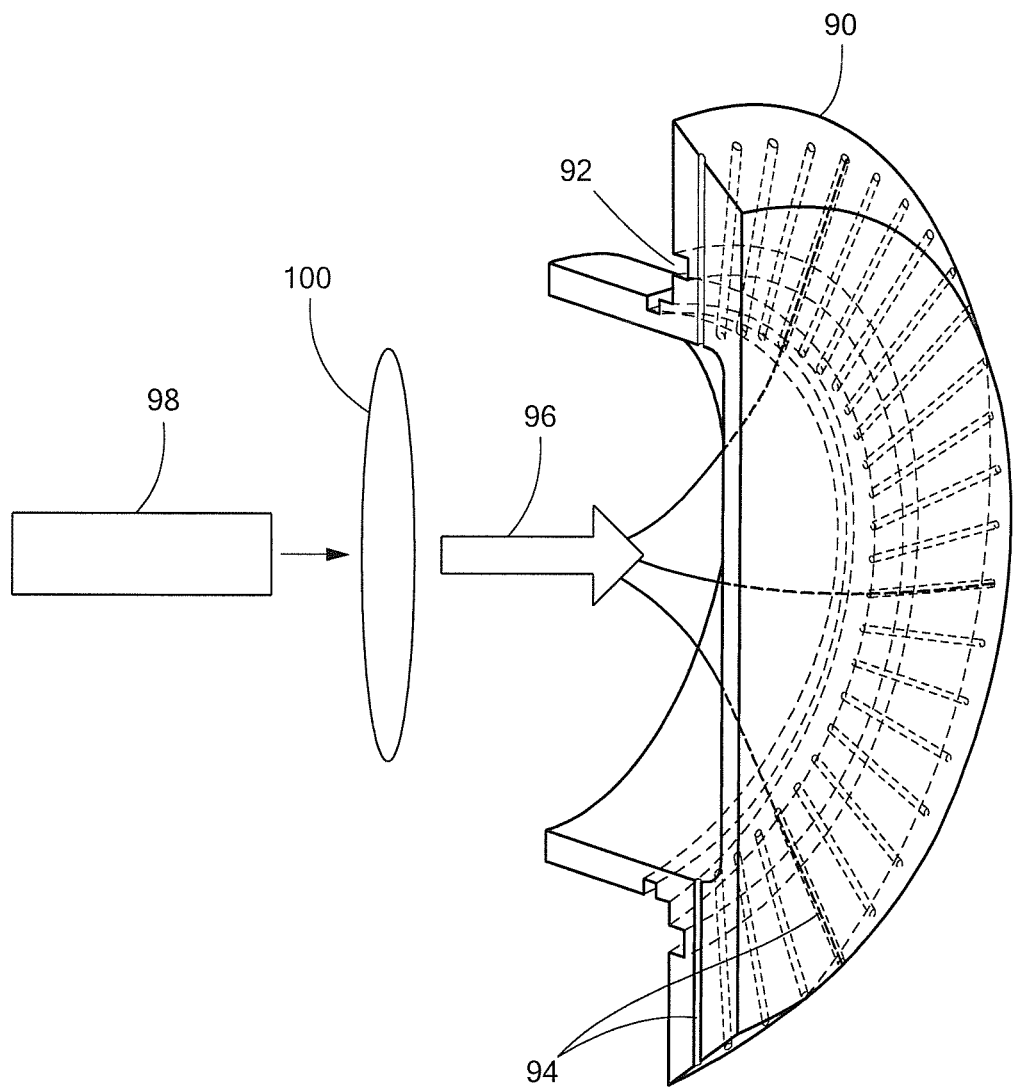
FIG. 6 is a block diagram showing another exemplary penetrating structure configured penetrate through a protected surface, for example, the protected surfaces of FIG. 1 or 4, wherein the penetrating structure includes an optical structure configured to receive ultraviolet light and configured to inject the ultraviolet light into an optical medium.

Referring now to FIG. 6, another exemplary penetrating structure 90 is configured to penetrate through a protected surface, for example, the protected surface 58a of FIG. 4 or the protected surface 26 of FIG. 1. The penetrating structure 90 comprises a seal region 92 coupled between the penetrating structure and the protected surface. In some embodiments the seal region 92 includes a seal, for example, an O-ring seal (not shown).

An optical structure 94 is coupled to receive UV light from a UV light source 98, for example, through a coupling structure 100, and configured to inject the UV light 96 into an optical medium, for example, into the optical fibers 12a, 12b, of FIG. 1, into the optical fibers of FIG. 2, into the optical fibers of FIGS. 3-3C, or into the optical layer 54 of FIG. 4.

Figure 7:
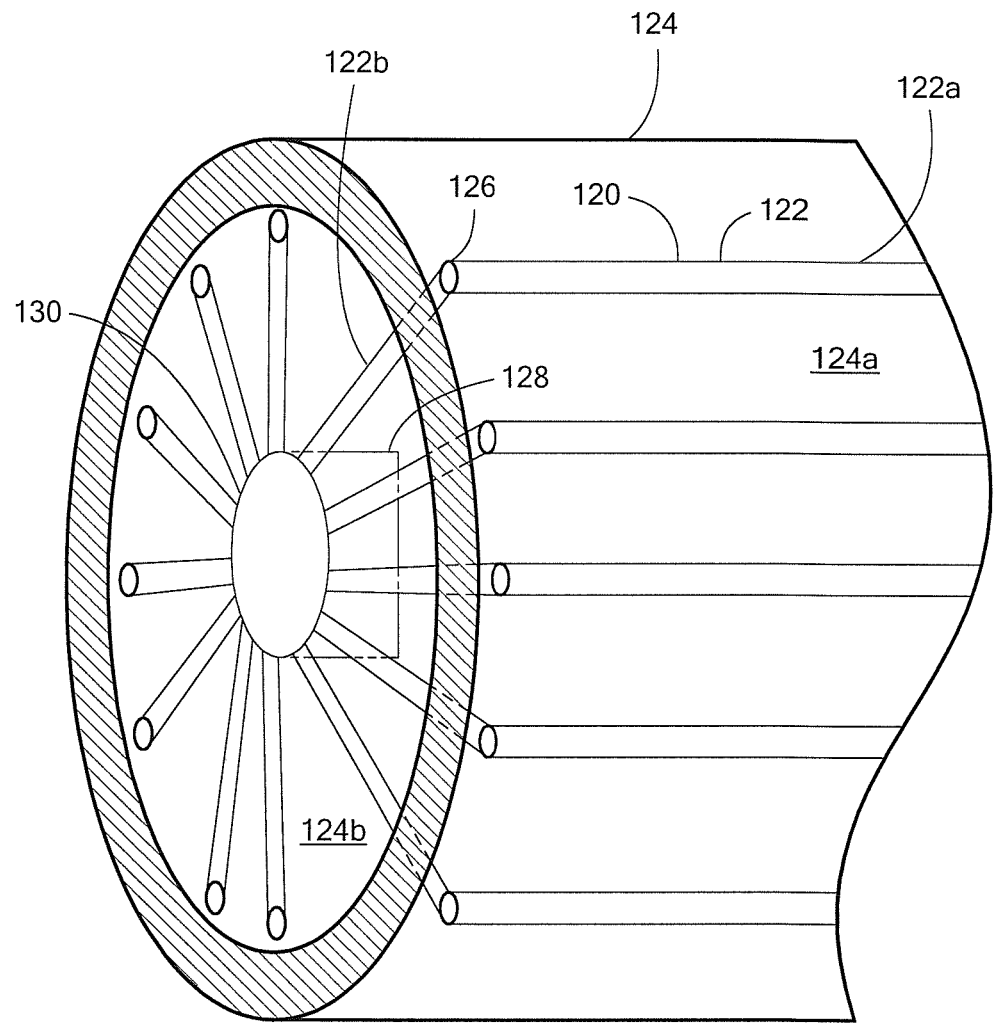
FIG. 7 is a block diagram showing a protected surface as a cylindrical surface, which has an optical medium in the form of optical fibers disposed under the protected surface or embedded in the protected surface.

Referring now to FIG. 7, an optical medium 120 can be comprised of a plurality of optical fibers, of which an optical fiber 122 is but one example. The optical fibers can have portions, for example a portion 122a, disposed upon a protected surface 124a of an object 124. Each optical fiber can have a pass through, for example, a pass through 126, passing through the object 124 from outside of the object to an inside 124b of the object 124.

Each optical fiber, for example, the optical fiber 122, can have a pass-through portion, for example, the pass-through portion 122b terminating in an optical coupler 130. A UV light source 128 can be coupled to provide UV light to the optical coupler 130, which is distributed to each one of the optical fibers.

The optical fibers 122 can be the same as or similar to any of the optical fiber shown above in conjunction with FIGS. 3-3C, or part of the mesh of FIG. 2. The optical fibers 122 can be disposed upon the surface 124a. In other embodiments, the optical fibers can be disposed within or under the surface 124a. For those embodiments in which the optical fibers are disposed within or under the surface 124a, the object 124 is transparent or nearly transparent to UV light.

Spacings between the optical fibers and power carried by the optical fibers are selected according to criteria described above in conjunction with FIG. 1.

In some embodiments, the object 124 is comprised of composite graphite. In other embodiments the object 124 is comprised of plastic.

The object 124 can be a pressure vessel configured to be disposed in water. For these embodiments, sealed end caps (not shown) can be disposed over ends of the object 124. In some embodiments, the object 124 is part of an autonomous underwater vehicle (AUV), or alternatively, an unmanned underwater vehicle (UUV). In other embodiments, the object 124 is part of a towed body.

Figure 8:
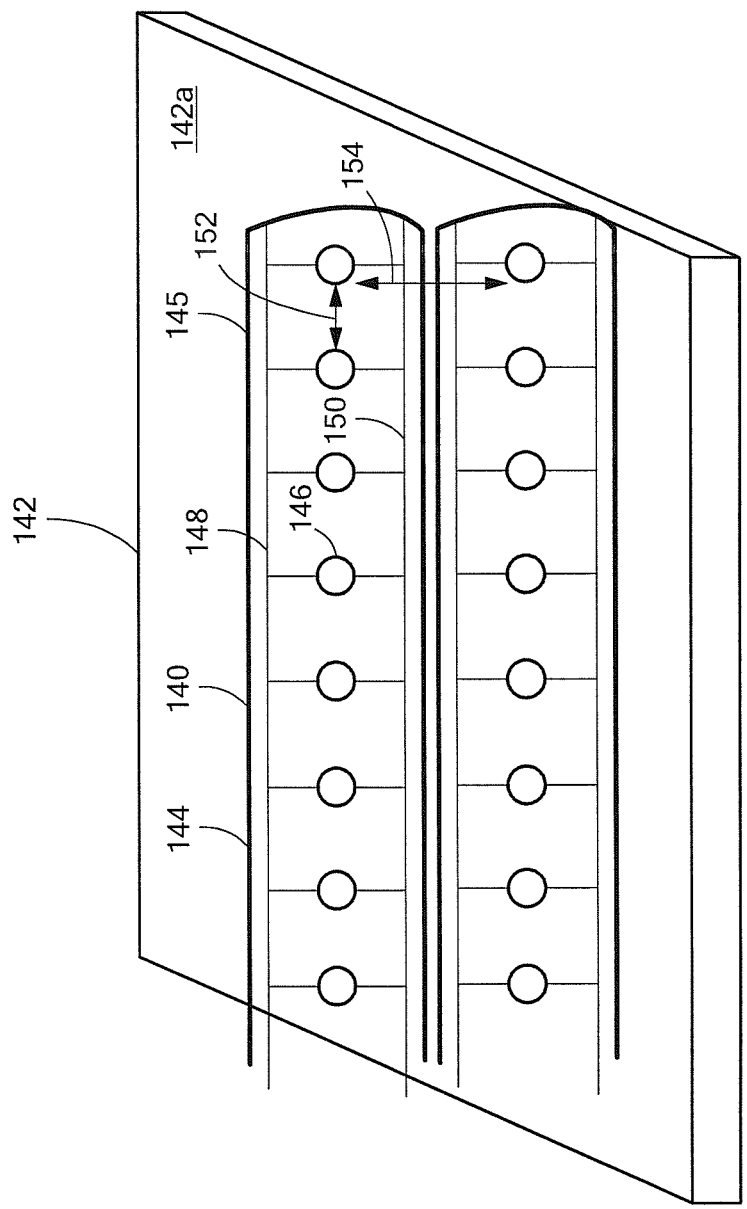
FIG. 8 is a block diagram showing two strip structures that can provide an optical medium upon a protected surface, the two strip structures each having a plurality of LEDS.

Referring now to FIG. 8, an optical medium 140 is comprised of one or more strips structures, for example, a strip structure 144. An ultraviolet light source comprises a plurality of UV LEDS, of which a UV LED 146 is but one example. The plurality of UV LEDs (UV light sources) and the optical medium are conjoined in a composite structure. The composite structure comprises one or more strip structures. Each strip structure includes a strip backing medium 145 and a plurality of UV LEDS coupled to the strip backing medium 145. The strip backing medium 145 is coupled proximate to a protected surface 142a.

The plurality of UV LEDS have spacings 152, 154 between the UV LEDS, UV output powers, and beamwidths of the UV light selected to result in a retardation of biological growth upon a substantial portion of the protected surface 142a.

Spacings between the UV LEDS, beamwidths, and powers of the UV LEDS are selected according to criteria described above in conjunction with FIG. 1.

While two strips structures are shown, in other embodiments, there can be more than or fewer than two strip structures.

All references cited herein are hereby incorporated herein by reference in their entirety.

Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. System for anti-biofouling a protected surface, comprising:
    an ultraviolet light source configured to generate ultraviolet light; and
    an optical medium disposed proximate to the protected surface and coupled to receive the ultraviolet light, wherein the optical medium has a thickness direction perpendicular to the protected surface, wherein two orthogonal directions of the optical medium orthogonal to the thickness direction are parallel to the protected surface, wherein the optical medium is configured to provide a propagation path of the ultraviolet light such that the ultraviolet light travels within the optical medium in at least one of the two orthogonal directions orthogonal to the thickness direction, and such that, at points along a surface of the optical medium, respective portions of the ultraviolet light escape the optical medium.

2. The system of claim 1, wherein the optical medium comprises a plurality of optical fibers, each optical fiber configured to carry the ultraviolet light along a length of the optical fiber, wherein a physical characteristic of the plurality of optical fibers changes along lengths of the plurality of optical fibers in a way selected to allow, at any point along the lengths of the plurality of optical fibers, a determined percentage of a total power of the ultraviolet light source to escape the optical fiber.

3. The system of claim 2, wherein the plurality of optical fibers is comprised of one or more of Silica, Ethylene Tetrafluoroethylene (ETFE), Fluorinated ethylene propylene (FEP), Polyether ether ketone (PEEK), or Polymethylpentene (PMP).

4. The system of claim 2, wherein spacings between adjacent ones of the plurality of optical fibers are selected to result in a retardation of biological growth upon a substantial portion of the protected surface.

5. The system of claim 2, wherein the plurality of optical fibers is formed into a mesh.

6. The system of claim 5, wherein the mesh comprised of at least one of a Kevlar mesh, a carbon fiber mesh, a fiberglass mesh, a Vectran mesh, an amorphous Polytetrafluoroethylene (PTFE) mesh, a Fluorinated ethylene propylene (FEP) mesh, a Polyether ether ketone (PEEK) mesh, an Ethylene Tetrafluoroethylene (ETFE) mesh, a Polymethylpentene (PMP) mesh, or a Hexafluoropropylene and Vinylidene Fluoride (THV) mesh, having the plurality of optical fibers disposed therein.

7. The system of claim 5, wherein the physical characteristic that changes comprises a cross sectional shape of selected ones of the plurality of optical fibers, the cross sections taken parallel to a thickness direction of the selected ones of the plurality of optical fibers, the cross sectional shapes changing along lengths of the selected ones of the plurality of optical fibers.

8. The system of claim 2, wherein each one of the plurality of optical fibers comprises a plurality of light scattering objects.

9. The system of claim 8, wherein the physical characteristic that changes comprises a number of the light scattering objects per volume along lengths of selected ones of the plurality of optical fibers.

10. The system of claim 8, wherein the physical characteristic that changes comprises a cross sectional shape of selected ones of the plurality of optical fibers, the cross sections taken parallel to a thickness direction of the selected ones of the plurality of optical fibers, the cross sectional shapes changing along lengths of the selected ones of the plurality of optical fibers.

11. The system of claim 2, wherein each one of the plurality of optical fibers comprises a plurality of microbends.

12. The system of claim 11, wherein the physical characteristic that changes comprises a number of the microbends per unit length.

13. The system of claim 11, wherein the physical characteristic that changes comprises a cross sectional shape of selected ones of the plurality of optical fibers, the cross sections taken parallel to a thickness direction of the selected ones of the plurality of optical fibers, the cross sectional shapes changing along lengths of the selected ones of the plurality of optical fibers.

14. The system of claim 2, wherein each one of the plurality of optical fibers comprises a selected surface roughness.

15. The system of claim 14, wherein physical characteristic that changes comprises a roughness of the surface roughness along lengths of selected ones of the plurality of optical fibers.

16. The system of claim 14, wherein the physical characteristic that changes comprises a cross sectional shape of selected ones of the plurality of optical fibers, the cross sections taken parallel to a thickness direction of the selected ones of the plurality of optical fibers, the cross sectional shapes changing along lengths of the selected ones of the plurality of optical fibers.

17. The system of claim 1, wherein the optical medium comprises an optical coating bonded proximate to the protected surface wherein the optical coating is configured to provide the propagation path of the ultraviolet light.

18. The system of claim 17, wherein a physical characteristic of the optical coating is selected to allow, at any point along a surface of the optical coating, a determined percentage of a total power of the ultraviolet light source to escape the optical layer.

19. The system of claim 18, wherein the optical coating is comprised of at least one of a urethane acrylate, an amorphous Polytetrafluoroethylene (PTFE), a Hexafluoropropylene and Vinylidene Fluoride (THV), a Polyether ether ketone (PEEK), a Fluorinated ethylene propylene (FEP), an Ethylene Tetrafluoroethylene (ETFE), or a Polymethylpentene (PMP).

20. The system of claim 18, wherein the physical characteristic changes about the optical coating, and wherein the physical characteristic comprises a roughness of the surface of the optical coating.

21. The system of claim 18, wherein the physical characteristic changes about the optical coating, and wherein the physical characteristic comprises a density of light scattering objects within or proximate to the optical coating.

22. The system of claim 1, wherein the ultraviolet light source comprises a plurality of light emitting diodes, wherein the plurality of light emitting diodes and the optical medium are conjoined in a composite structure, wherein the composite structure comprises a plurality of strip structures, each strip structure comprising:
   a strip backing medium; and
   at least a portion of the plurality of light emitting diodes coupled to the strip backing medium, wherein the strip backing medium is coupled proximate to the protected surface.

23. The system of claim 22, wherein ones of the plurality of light emitting diodes have spacings between the ones of the light emitting diodes, and the ones of the plurality of light emitting diodes have beamwidths of the ultraviolet light, wherein the spacings and the beamwidths are selected to result in a retardation of biological growth upon a substantial portion of the protected surface.

24. The system of claim 1, further comprising a penetrating structure configured to penetrate through the protected surface, wherein the penetrating structure comprises:
   a seal coupled between the penetrating structure and the protected surface; and at least one of:
   an optical structure configured to generate the ultraviolet light and configured to inject the ultraviolet light into the optical medium, or
   an optical structure coupled to receive the ultraviolet light and configured to inject the ultraviolet light into the optical medium.

25. The system of claim 1, wherein the optical medium is disposed under the protected surface or embedded in the protected surface.

26. The system of claim 25, wherein the optical medium comprises a plurality UV LEDS.

27. The system of claim 25, wherein the optical medium comprises a plurality of optical fibers.

28. The system of claim 27, wherein the plurality of optical fibers is formed into a mesh.

29. Method of anti-biofouling a protected surface, comprising:
   generating ultraviolet light; and
   distributing the ultraviolet light about a protected surface though an optical medium disposed proximate to the protected surface, wherein the optical medium has a thickness direction perpendicular to the protected surface, wherein two orthogonal directions of the optical medium orthogonal to the thickness direction are parallel to the protected surface, wherein the optical medium is configured to provide a propagation path of the ultraviolet light such that the ultraviolet light travels within the optical medium in at least one of the two orthogonal directions orthogonal to the thickness direction, and such that, at points along a surface of the optical medium, respective portions of the ultraviolet light escape the optical medium.

* * * * *